US011097852B2

(12) United States Patent
Turner et al.

(10) Patent No.: US 11,097,852 B2
(45) Date of Patent: Aug. 24, 2021

(54) SYSTEMS AND METHODS FOR OBTAINING SENSOR DATA INDICATIVE OF FLIGHT CHARACTERISTICS OF AN AIRCRAFT USING AN ACOUSTICALLY POWERED SENSOR UNIT

(71) Applicant: The Boeing Company, Chicago, IL (US)

(72) Inventors: James B. Turner, Monroe, WA (US); Charles S. Foss, Port Orchard, WA (US)

(73) Assignee: The Boeing Company, Chicago, IL (US)

( * ) Notice: Subject to any disclaimer, the term of this patent is extended or adjusted under 35 U.S.C. 154(b) by 319 days.

(21) Appl. No.: 16/203,238

(22) Filed: Nov. 28, 2018

(65) Prior Publication Data

US 2020/0165003 A1 May 28, 2020

(51) Int. Cl.
*B64D 45/00* (2006.01)
*H02J 50/15* (2016.01)
*G07C 5/08* (2006.01)

(52) U.S. Cl.
CPC ............. *B64D 45/00* (2013.01); *G07C 5/085* (2013.01); *H02J 50/15* (2016.02); *B64D 2045/0085* (2013.01)

(58) Field of Classification Search
CPC .................... B64D 45/00; B64D 47/00; B64D 2045/0085; B64D 2221/00; G07C 5/085;
(Continued)

(56) References Cited

U.S. PATENT DOCUMENTS 7,276,703 B2   10/2007   Berkcan et al.
2010/0141377 A1   6/2010   Andarawis et al.
(Continued)

FOREIGN PATENT DOCUMENTS

CN    107 923 372       4/2018
WO    WO 2017/216119    12/2017
WO    WO 2017/216119 A1 * 12/2017 ............. B64D 29/00

OTHER PUBLICATIONS

Khan, Farid Ullah et al., "Electromagnetic-based acoustic energy harvester", INMIC, IEEE, Dec. 19, 2013, pp. 125-130.
(Continued)

*Primary Examiner* — Brian P Sweeney
(74) *Attorney, Agent, or Firm* — McDonnell Boehnen Hulbert & Berghoff LLP (57) ABSTRACT

In an example, an acoustically powered sensor unit for obtaining sensor data indicative of flight characteristics of an aircraft is described. The acoustically powered sensor unit includes a housing having a first portion comprising a diaphragm and a second portion coupled to an exterior of an aircraft and. The diaphragm is configured to receive acoustic energy from an engine of the aircraft. The acoustically powered sensor unit further includes a voice coil actuator disposed within the housing and coupled to the diaphragm. The voice coil actuator is configured to receive kinetic energy by way of a vibration of the diaphragm and responsively generate an electrical power signal. The acoustically powered sensor unit further includes one or more sensors disposed within the housing and powered using energy from the electrical power signal. The one or more sensors are configured to obtain the sensor data indicative of flight characteristics of the aircraft.

20 Claims, 8 Drawing Sheets

(58) Field of Classification Search
CPC ...... G01L 19/086; G01D 21/02; G01D 11/00; G01M 15/14; G01M 15/02; B64F 5/60; H02J 7/32; H02J 50/15; H02J 50/001; H02J 2310/44
See application file for complete search history.

(56) References Cited

U.S. PATENT DOCUMENTS

| | | |
|---|---|---|
| 2012/0330499 A1 | 12/2012 | Scheid et al. |
| 2013/0020806 A1 | 1/2013 | Hsu |
| 2017/0366077 A1* | 12/2017 | Oonishi ................. H02J 1/00 |
| 2019/0118978 A1* | 4/2019 | Fanton .................. B64F 5/60 |

OTHER PUBLICATIONS

Khan, Farid Ullah et al., "Electromagnetic energy harvester for harvesting acoustic energy", Sadhana, Indian Academy of Sciences, Bangalore, IN, vol. 41, No, 4, Apr. 25, 2016, pp. 397-405.
Extended European Search Report prepared the European Patent Office in application No. EP 19 21 1632.5 dated Apr. 23, 2020.

\* cited by examiner

SYSTEMS AND METHODS FOR OBTAINING SENSOR DATA INDICATIVE OF FLIGHT CHARACTERISTICS OF AN AIRCRAFT USING AN ACOUSTICALLY POWERED SENSOR UNIT

FIELD

The present disclosure relates generally to operation of an aircraft, and more particularly, to methods and systems for using an acoustically powered sensor unit to obtain sensor data indicative of flight characteristics of an aircraft.

BACKGROUND

An aircraft or an airplane needs consistent maintenance and is subject to regular testing. To determine relevant flight characteristics of the aircraft, sensors are generally used. Sensors may determine, for example, temperature, acceleration, pressure, and other characteristics during flight for evaluating performance of the aircraft and/or an engine of the aircraft during flight.

Existing sensors used for determining flight characteristics require use of batteries or power lines from a fuselage of the aircraft. Where such sensors are powered using batteries, they require regular battery replacement or might lose power during flight. Where the sensors are powered by power lines, they may difficult to install, uninstall, or to re-use. These issues impact the complexity, cost, and reliability of existing methods for determining aircraft performance.

What is needed is a sensor unit that can be reliably and sustainably powered without reliance on batteries, while being simple to install and use.

SUMMARY

In an example, an acoustically powered sensor unit for obtaining sensor data indicative of flight characteristics of an aircraft is described. The acoustically powered sensor unit comprises a housing comprising a first portion comprising a diaphragm, wherein the diaphragm is configured to receive acoustic energy from an engine of the aircraft, and a second portion coupled to an exterior of an aircraft. The acoustically powered sensor unit further comprises a voice coil actuator disposed within the housing and coupled to the diaphragm, wherein the voice coil actuator is configured to receive kinetic energy by way of a vibration of the diaphragm and responsively generate an electrical power signal. The acoustically powered sensor unit further comprises one or more sensors disposed within the housing and powered using energy from the electrical power signal, wherein the one or more sensors are configured to obtain the sensor data indicative of flight characteristics of the aircraft.

In another example, a system for obtaining sensor data indicative of flight characteristics of an aircraft is described. The system comprises an engine of the aircraft. The system further comprises a nacelle associated with the engine. The system further comprises an acoustically powered sensor unit. The acoustically powered sensor unit comprises a housing comprising a first portion comprising a diaphragm, wherein the diaphragm is configured to receive acoustic energy from the engine, and a second portion coupled to the nacelle. The acoustically powered sensor unit further comprises a voice coil actuator disposed within the housing and coupled to the diaphragm, wherein the voice coil actuator is configured to receive kinetic energy by way of a vibration of the diaphragm and responsively generate an electrical power signal. The acoustically powered sensor unit further comprises one or more sensors disposed within the housing and powered using energy from the power signal, wherein the one or more sensors are configured to obtain the sensor data indicative of flight characteristics of the aircraft.

In another example, a method for obtaining sensor data using an acoustically powered sensor unit coupled to an aircraft is described. The method comprises receiving, from an aircraft engine, by way of a diaphragm of the sensor unit, acoustic energy. The method further comprises transferring the acoustic energy received by the diaphragm to a voice coil actuator of the sensor unit. The method further comprises generating, by the voice coil actuator, an electrical power signal. The method further comprises powering one or more sensors of the sensor unit using energy from the electrical power signal. The method further comprises determining, by the one or more sensors, sensor data indicative of one or more flight characteristics of the aircraft.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods for obtaining sensor data using an acoustically powered sensor unit coupled to an aircraft are described. More specifically, systems and methods that use acoustic energy from an aircraft to power sensors of the sensor unit are described. More specifically, systems and methods for receiving acoustic energy using a diaphragm of a sensor unit, receiving kinetic energy from a vibration of the diaphragm, and responsively generating an electrical power signal for powering the sensors are described. The sensors are configured to obtain sensor data indicative of flight characteristics of the aircraft.

Example systems and methods involve maximizing the amount of acoustic energy received from the aircraft. In one example, the sensor unit is coupled to a nacelle of the aircraft and/or oriented towards the nacelle to maximize acoustic energy received from an engine of the aircraft associated with the nacelle. In one example, the diaphragm is configured to vibrate in accordance with frequencies associated with relatively high power outputs from the engine. For example, the diaphragm can have a diameter between 30 millimeters (mm) and 40 mm in order to maximize acoustic energy received from the engine.

Example systems and methods involve using the sensor unit and/or a plurality of sensor units to evaluate aspects of aircraft performance. In one example, a housing of the sensor unit can include one or more pressure differential diaphragms and corresponding pressure transducers configured to determine a pressure differential based on pressure data from the pressure transducers. In this example, engine performance can be determined by comparing the determined pressure differential to an expected pressure differential. In another example, integrated sensors of the aircraft can be evaluated by comparing sensor data obtained by the integrated sensors to sensor data from the sensor unit. In another example, the sensor unit can be evaluated by comparing sensor data from the sensor unit to sensor data from one or more additional sensor units. Still other examples of using the sensor unit to evaluate aspects of aircraft performance are described.

Figure 1:
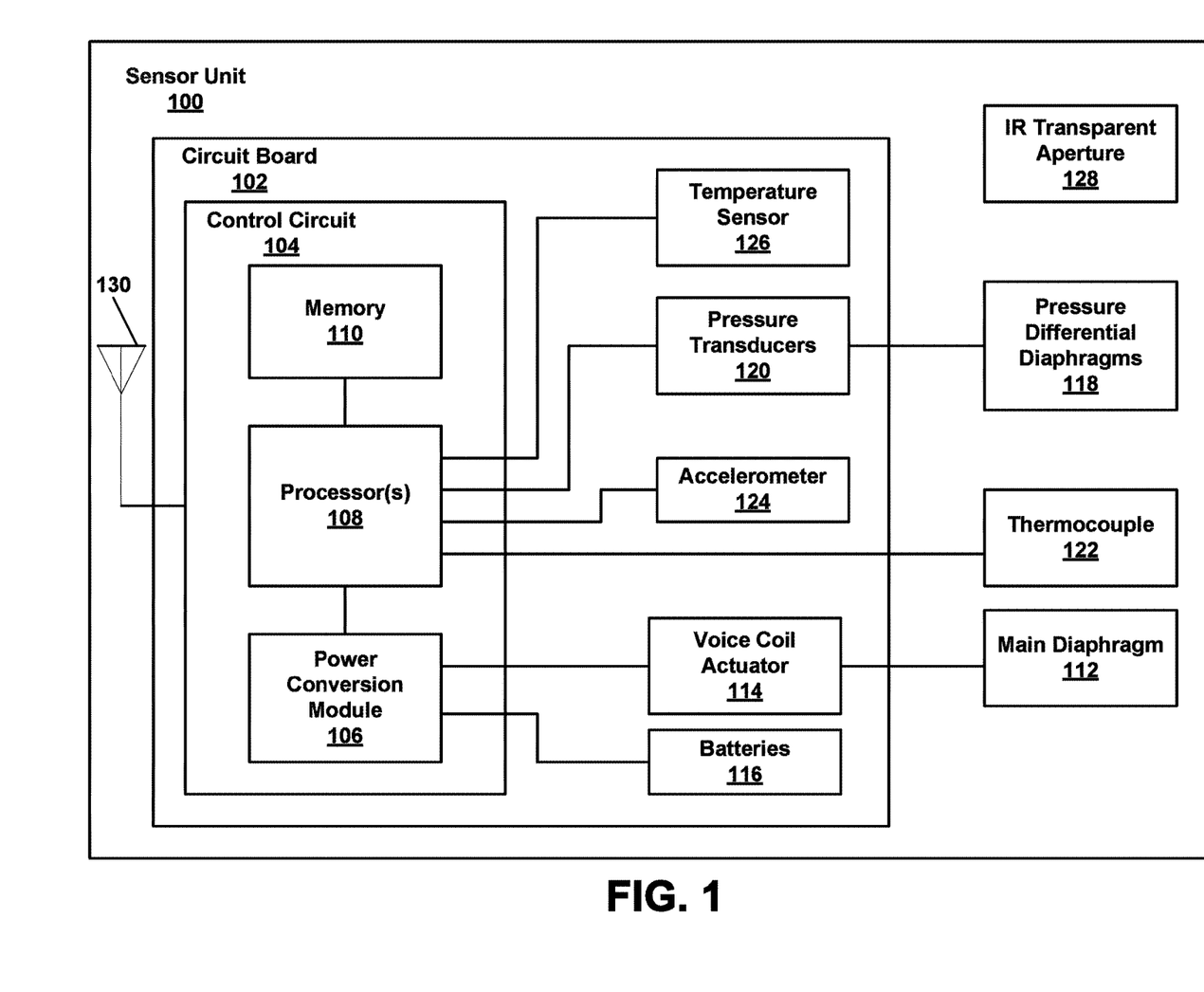
FIG. 1 illustrates a block diagram of an example acoustically powered sensor unit, according to an example implementation.

Referring now to the figures, FIG. 1 illustrates a block diagram of an example of a sensor unit 100, according to an example implementation. In some examples, the sensor unit 100 is an acoustically powered sensor unit. Sensor unit 100 includes a circuit board 102. Circuit board 102 includes a control circuit 104, which includes a power conversion module 106, one or more processor(s) 108, and a memory 110.

Memory 110 may include or take the form of one or more computer-readable storage media that can be read or accessed by one or more processor(s) 108. The computer-readable storage media can include volatile and/or non-volatile storage components, such as optical, magnetic, organic or other memory or disc storage, which can be integrated in whole or in part with processor(s) 108. Memory 110 is considered non-transitory computer readable media. In some examples, memory 110 can be implemented using a single physical device (e.g., one optical, magnetic, organic or other memory or disc storage unit), while in other examples, memory 110 can be implemented using two or more physical devices. Memory 110 thus is a non-transitory computer readable storage medium, and executable instructions are stored thereon. The instructions include computer executable code. Memory 110 and control circuit 104 store and use sensor data from sensors of The one or more processor(s) 108 may be general-purpose processors or special purpose processors (e.g., digital signal processors, application specific integrated circuits, etc.). The processor(s) 108 may receive inputs from sensors of sensor unit 100, and process the inputs to generate sensor data that is stored in memory 110. In some examples, processing the inputs from the sensors by the one or more processor(s) 108 can include receiving raw data from each sensor and assigning corresponding values to that data, assigning timestamps to data as it is received, and/or sending the received raw data to particular portions of memory 110. The one or more processor(s) 108 can be configured to execute the executable instructions (e.g., computer-readable program instructions) that are stored in memory 110 the data storage and are executable to provide the functionality of sensor unit 100, and related systems and methods described herein.

Sensor unit 100 further includes a main diaphragm 112 that is configured to receive acoustic energy from an engine of an aircraft. Main diaphragm 112 may be, for example, disposed on a top surface of a housing of sensor unit 100. For example, as described further below, sensor unit 100 can include a first portion of a housing that includes main diaphragm 112, and also include a second portion of the housing that attaches to an aircraft. Thus, the top surface can be an exterior portion of the housing that faces away from the part of the aircraft to which the second portion of the housing is attached.

Sensor unit 100 further includes a voice coil actuator 114 configured to receive kinetic energy from vibrations of main diaphragm 112, and responsively generates an electrical power signal. Power conversion module 106 is configured to receive the electrical power signal from voice coil actuator 114, and to perform one or both of (i) charging batteries 116 and (ii) powering sensors of sensor unit 100 by way of one or more processor(s) 108. For instance, power conversion module 106 can be a multifunctional integrated circuit that serves as a voice coil actuator driver, determines a power level associated with the electrical power signal received from voice coil actuator, and determines a charge level of batteries 116. Power conversion module 106 may communicate with the one or more processors(s) 108 to determine whether to charge batteries 116 or to directly power the sensors using the electrical power signal received from voice coil actuator 114.

Thus, in one example, control circuit 104 and battery 116 are electrically coupled to voice coil actuator 114. For example, control circuit 104 may determine a power output of voice coil actuator 114 by determining a current received from voice coil actuator 114 and calculate the power output using the determined current and a known resistance of sensor unit 100. Determining the power output may be performed by power conversion module 106, the one or more processor(s) 108, or a combination thereof, where power conversion module 106 sends data indicative of voltage or current values in the received electrical power signal, and the one or more processor(s) 108 determine the power output. Further, based on the determined power output, control circuit 104 can either (i) charge one or more of the batteries 116 using the electrical power signal, or (ii) discharge one or more of the batteries 116 in order to power the one or more sensors. For example, if the power output of voice coil actuator 114 is below a first threshold value, the sensors may require power from the batteries 116 in order to function. If the power output of voice coil actuator 114 is above a second threshold value, for instance a maximum power output of batteries 116, the electrical power signal may be sufficient to charge batteries 116 and power the sensors. If the power output is between the first threshold value and the second threshold value, the electrical power signal may be sufficient to power the sensors, but not to charge batteries 116. In this fashion, sensor unit 100 can reliably operate and keep fully charged, or nearly fully charged, batteries 116 during flight.

Though voice coil actuator 114 is depicted in FIG. 1, any type of kinetic-to-electrical energy converter can be used. Further, in some examples, power conversion module 106 may determine whether to recharge the one or more batteries 116 based on control signals received from processor(s) 108. In other examples, power conversion module 106 may include logic components that control power conversion without input from processor(s) 108.

Sensor unit 100 further includes pressure differential diaphragms 118. Pressure differential diaphragms 118 can be placed at different locations on sensor unit 100 to allow for determination of a difference in pressure between two or more locations, as explained further below. Pressure transducers 120 correspond to the pressure differential diaphragms 118 and can provide inputs to processor(s) 108 to determine pressure data based on vibrations and/or deflection of the pressure differential diaphragms 118. Pressure differentials determined from the pressure data can be used to evaluate a performance of the engine, as described further below. For example, expected in-flight pressure differentials can be determined based on past flight data or simulated data. The determined pressure data can be compared to the expected pressure data, and engine performance can be determined based on how similar the determined pressure data is to the expected pressure data.

Other sensors of sensor unit 100 can include a thermocouple 122, an accelerometer 124, and a temperature sensor 126. Other sensors are possible as well. Data determined from the pressure transducers 120, thermocouple 122, accelerometer 124, temperature sensor 126, or other sensors of sensor unit 100 may be referred to as sensor data.

Sensor unit 100 further includes an infrared (IR) transparent aperture 128, and an antenna 130 that allows sensor unit 100 to communicate with other sensor units or with the aircraft. In examples where antenna 130 is disposed within a housing, IR transparent aperture 128 can allow for less attenuation of signals sent and received by antenna 130.

In one example, as described further below, sensor unit 100 can use antenna 130, which is coupled to control circuit 104, to communicate with other similar sensor units to compare sensor data from the respective sensor units and, based on the compared sensor data, evaluate a performance of sensor unit 100. In such examples, sensor unit 100 having similar sensor data to that of other sensor units can indicate that sensor unit is performing normally, while sensor unit 100 having sensor data that is inconsistent other sensor units may indicate that sensor unit 100 not performing normally.

In another example, antenna 130 may receive a control signal from the aircraft. Control circuit 104, may be configured to select a particular sensor, such as thermocouple 122 from among the sensors to receive energy from the electrical power signal generated by voice coil actuator 114 based on the received control signal. In some examples, control circuit 104 may make this determination on its own. Though in some examples receiving energy from the electrical power signal may include receiving electrical energy directly from voice coil actuator 114, receiving energy from the electrical power signal might also include receiving energy stored by batteries 116 and received from voice coil actuator 114.

Figure 2A:
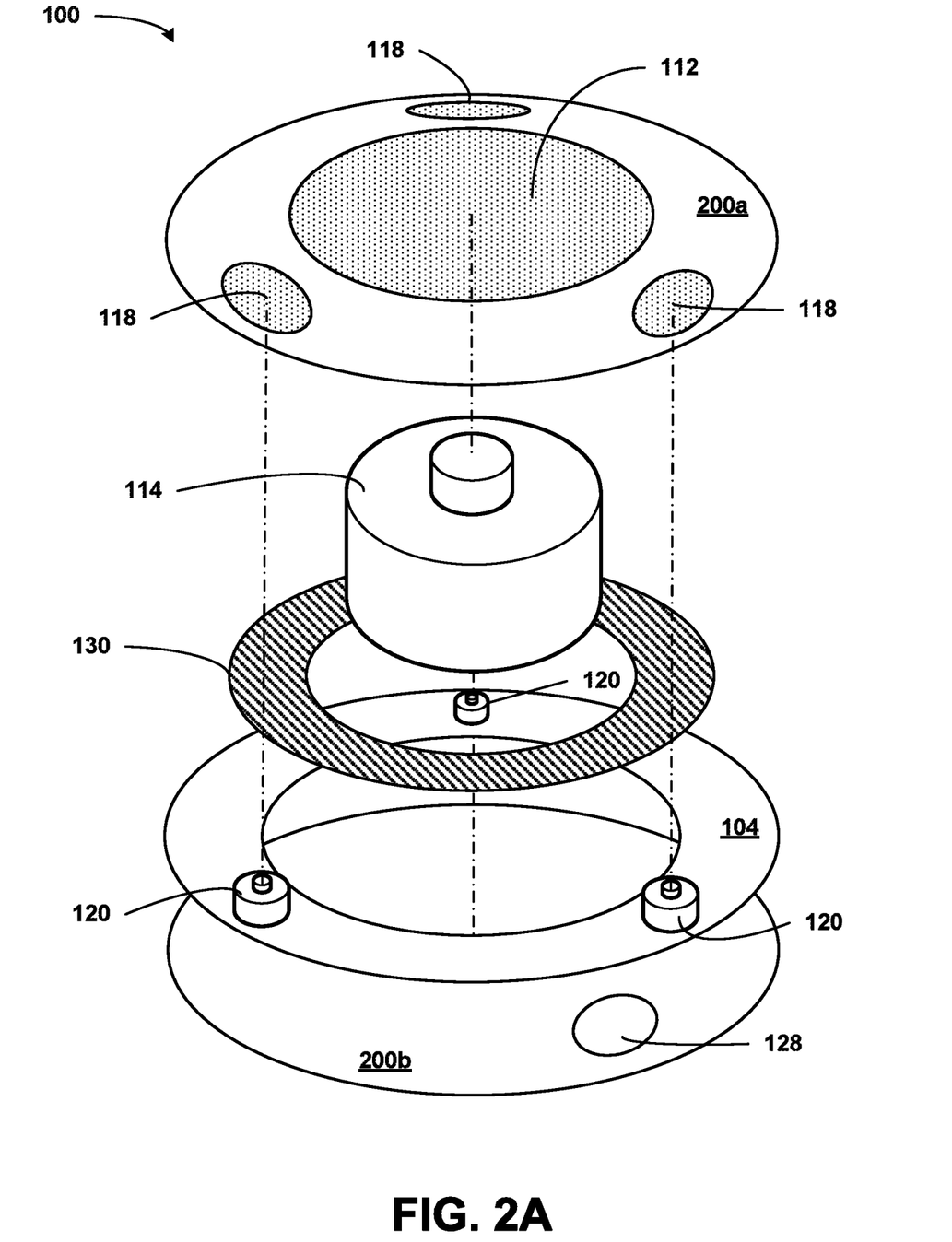
FIG. 2A is an example illustration of the acoustically powered sensor unit, according to an example implementation.

FIG. 2A is an example illustration of the sensor unit 100, according to an example implementation. In particular, FIG. 2A depicts an exploded view of sensor unit 100. As shown in FIG. 2A, sensor unit 100 includes the same or similar components depicted in FIG. 1. Sensor unit 100, as depicted in FIG. 2A, includes the control circuit 104, main diaphragm 112, voice coil actuator 114, pressure differential diaphragms 118, pressure transducers 120, IR transparent aperture 128, and antenna 130. Other elements depicted in FIG. 1 have been omitted for purposes of simplicity.

FIG. 2A further depicts a first portion of a housing 200a, and a second portion of a housing 200b, which together encapsulate and/or incorporate the other components of sensor unit 100. The first portion of housing 200a is a top surface that includes main diaphragm 112 and pressure differential diaphragms 118. In one example, the first portion of housing 200a is curved to generate a pressure differential across the top surface. This allows the pressure differential diaphragms 118 to determine a noticeable pressure differential across a small space.

The second portion of the housing 200b may be a baseplate that couples to the first portion of the housing 200a, and serves to attach sensor unit 100 to the aircraft. For example, an adhesive may couple the second portion of the housing 200b to the aircraft. The IR transparent aperture 128 is depicted as being part of the second portion of the housing 200b. However, IR transparent aperture 128 might be located elsewhere on sensor unit 100.

Figure 2B:
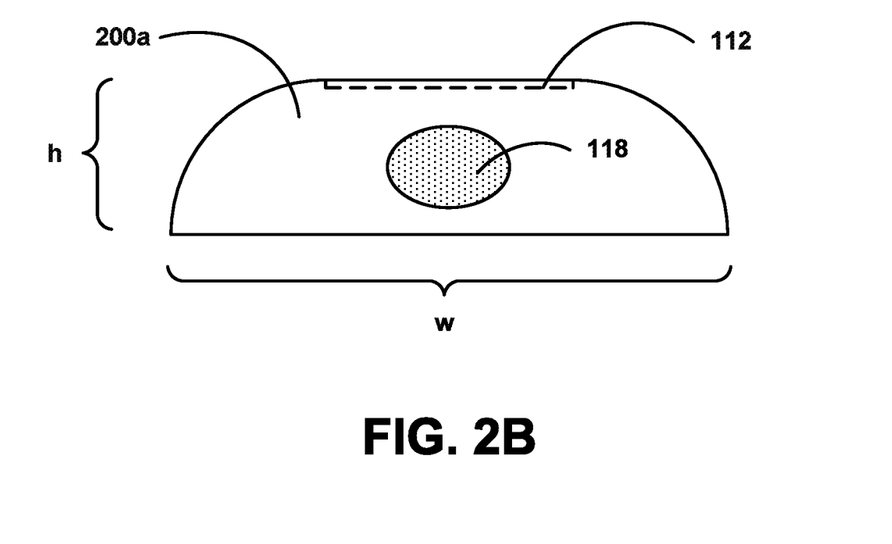
FIG. 2B is another example illustration of the acoustically powered sensor unit, according to an example implementation.

FIG. 2B is another example illustration of sensor unit 100, according to an example implementation. In particular, FIG. 2B depicts a side view of sensor unit 100. FIG. 2B shows first portion of the housing 200a, a pressure differential diaphragm 118, and main diaphragm 112. Further, FIG. 2B depicts sensor unit 100 as having a width "w" and a height "h." As noted above, in some examples, the size and profile of sensor unit may be reduced to reduce drag. For instance, in one example, sensor unit 100 is less 3" wide, less than 1" tall, and weighs less than 4 ounces.

Figure 2C:
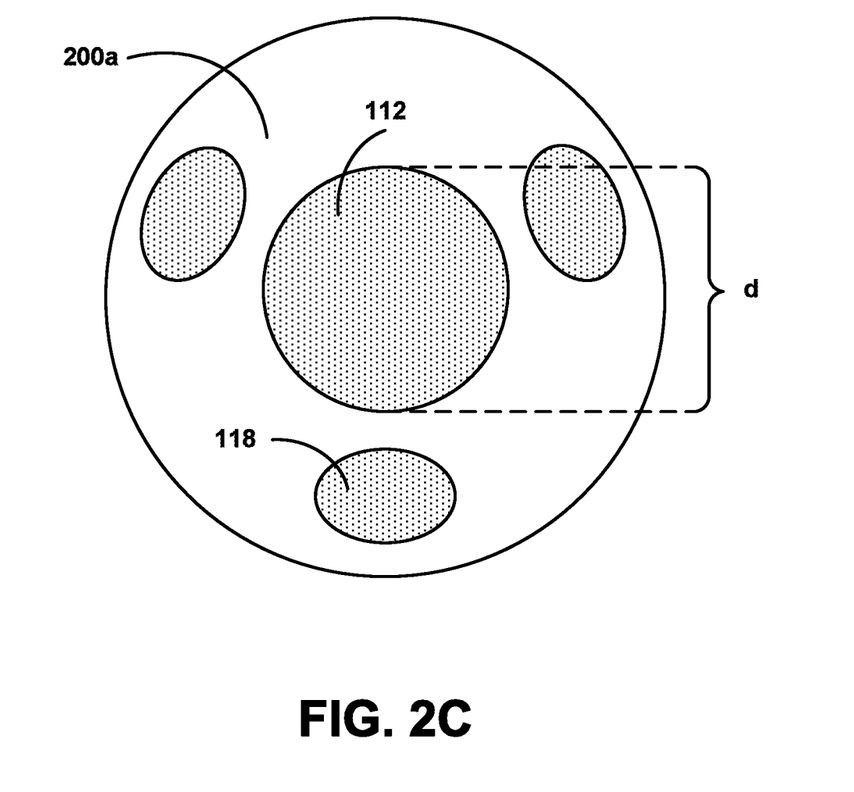
FIG. 2C is another example illustration of the acoustically powered sensor unit, according to an example implementation.

FIG. 2C is another example illustration of sensor unit 100, according to an example implementation. In particular, FIG. 2C depicts a top view of sensor unit 100. FIG. 2C shows first portion of the housing 200a, pressure differential diaphragms 118, and main diaphragm 112. Further, FIG. 2C depicts a diameter "d" of main diaphragm 112. In some examples, sensor unit 100 is configured to maximize the amount of acoustic power received from an engine of the aircraft. Accordingly, in one example, the diameter of main diaphragm 112 is no less than 30 millimeters (mm) and no greater than 40 mm. In this fashion, the diaphragm can maximize acoustic energy received from frequencies associated with an engine of the aircraft. For instance, an aircraft engine may output a relatively high acoustic power output in the range of frequencies from 80 Hz to 90 Hz. Accordingly, using a range of 30 mm to 40 mm in main diaphragm 112 may allow sensor unit 100 to maximize the amount of energy received from frequencies in the range of about 80 to 90 Hz. Different diameters might be used depending on the desired source of acoustic energy.

FIG. 2C also shows how the main diaphragm 112 and pressure differential diaphragms 118 are disposed on the first portion of the housing 112a. Main diaphragm 112 is centrally located on a top portion of sensor unit 100. This area may be referred to as a central portion of sensor unit 100. Pressure differential diaphragms 118 are disposed outside the central portion occupied by main diaphragm 112. Thus, these may be referred to as being disposed on an outer portion of sensor unit 100. As depicted, pressure differential diaphragms 118 are positioned radially from a center point of the sensor unit 100. Though three pressure differential diaphragms 118 are depicted, and are substantially equidistant from one another, other arrangements are possible. For example, in some examples, two pressure transducers 120 may be arranged opposite one another on the outer portion of sensor unit 100.

Also in order to maximize received acoustic energy, the housing might be coupled to the exterior of the aircraft such that main diaphragm 112 is oriented towards the engine. For example, the second portion of the housing 200b might be coupled to a portion of a fuselage of the aircraft that faces an engine. In turn, the first portion of the housing 200a may also face the engine. The housing may also be coupled directly to the nacelle in order to maximize acoustic energy received from the engine.

Figure 3:
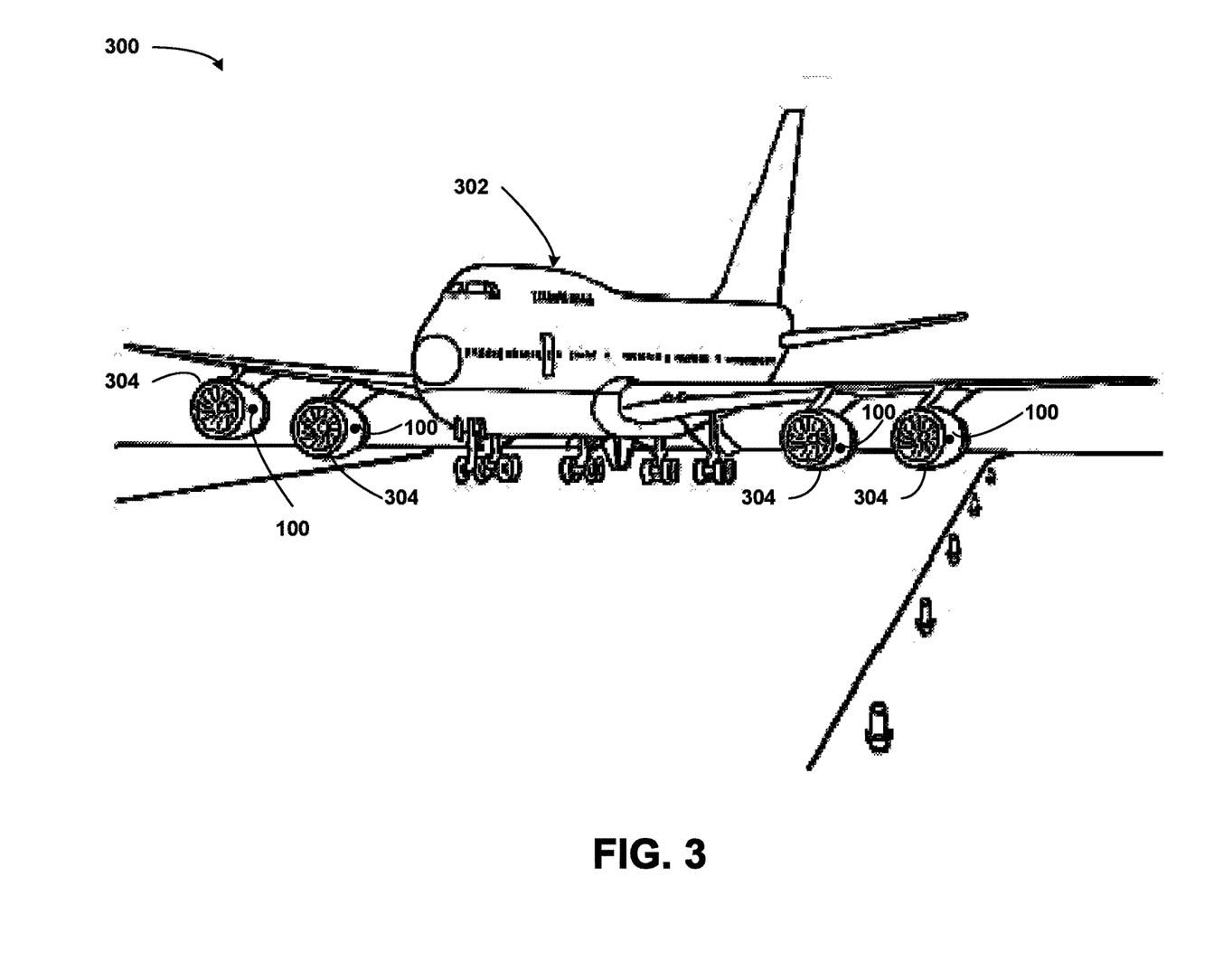
FIG. 3 is an example illustration of a system that includes an aircraft and a plurality of acoustically powered sensor units coupled to the aircraft.

FIG. 3 is an example illustration of a system 300 that includes an aircraft 302 and a plurality of sensor units 100 coupled to the aircraft. Each sensor unit 100 is coupled to a nacelle 304 associated with a given engine. Though FIG. 3 depicts aircraft 302 as having four engines, the aircraft may have more or fewer engines. Further, though each sensor unit is depicted as being coupled to a nacelle 304, sensor units may be placed at other locations on aircraft 302.

As noted above, coupling rechargeable sensor units on aircraft 302 may serve several purposes. For instance, aircraft 302 may include an aircraft controller. The aircraft controller may receive sensor data from a sensor unit 100, and control the aircraft 302 based on the received sensor data. For example, the aircraft controller may alter in-flight behavior based on temperature data, acceleration data, pressure data, or the like received from sensor unit 100. As another example, the aircraft controller may take engine performance into account. Pressure data from a first sensor unit that corresponds to a first engine and second pressure data from a second sensor unit that corresponds to a second engine indicates that one engine is performing worse than the other. For instance this may be determined based on differences between the respective pressure data of the first engine and the second engine and an expected pressure differential. In response to this determination, the aircraft controller may rely more on the better-performing engine during flight. The aircraft controller may control the aircraft 302 based on other sensor data as well.

Operation of sensor units 100 may also depend on operation of aircraft 302. For example, a sensor unit 100 may determine when an engine of aircraft 302 is running, e.g. based on a power output of voice coil actuator 114 a determined pressure differential from pressure differential diaphragms 118. Responsive to determining that the engine is running, the sensor unit 100 may charge its one or more batteries 116. Similarly, sensor unit 100 may determine when the engine is not running, and responsively discharge the battery to power the one or more sensors when the engine is not running.

Figure 4:
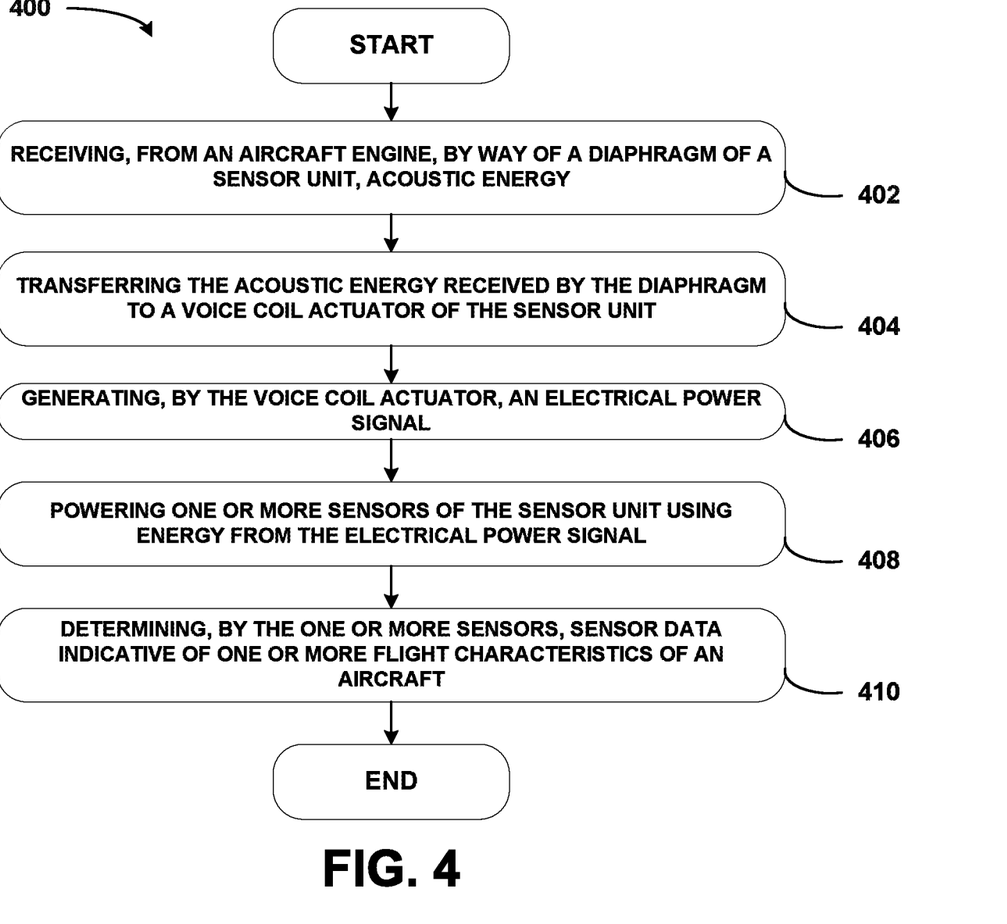
FIG. 4 shows a flowchart of an example for obtaining sensor data using an acoustically powered sensor unit coupled to an aircraft, according to an example implementation.

FIG. 4 shows a flowchart of an example for obtaining sensor data using an acoustically powered sensor unit coupled to an aircraft, according to an example implementation. Method 400 shown in FIG. 4 presents an example of a method that could be used with the sensor unit 100 shown in FIG. 1, 2A, 2B, 2C, or 3, with components of sensor unit 100, or in conjunction with an aircraft, such as aircraft 302 shown in FIG. 3, for example. Further, devices or systems may be used or configured to perform logical functions presented in FIG. 4. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 400 may include one or more operations, functions, or actions as illustrated by one or more of blocks 402-410. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 4, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 402, method 400 includes receiving, from an aircraft engine, by way of a diaphragm 112 of the sensor unit 100, acoustic energy. Sensor unit 100 may be coupled to an aircraft, such as aircraft 302, and be acoustically powered using acoustic energy from the aircraft engine, as described further in method 400. Diaphragm 112 may be a main diaphragm of sensor unit 100. Further, diaphragm 112 may be configured to vibrate in response to receiving acoustic energy from the aircraft engine.

At block 404, method 400 includes transferring the acoustic energy received by the diaphragm 112 to a voice coil actuator 114 of the sensor unit 100. Voice coil actuator 114 may receive kinetic energy by way of motion of the vibrating diaphragm 112.

At block 406, method 400 includes generating, by the voice coil actuator 114, an electrical power signal. Voice coil actuator 114 may be configured to translate kinetic energy into electrical energy. Thus, the generated electrical power signal may be generated as a result of the voice coil actuator receiving the kinetic energy from the vibrating diaphragm.

At block 408, method 400 includes powering one or more sensors of the sensor unit 100 using energy from the electrical power signal. The one or more sensors may include pressure transducers 120, thermocouple 122, accelerometer 124, temperature sensor 126, or other sensors. The one or more sensors may be powered directly by the electrical power signal by way of power conversion module 106, or may be powered by batteries 116 that have been charged using energy from the electrical power signal.

At block 410, method 400 includes determining, by the one or more sensors, sensor data indicative of one or more flight characteristics of the aircraft. Sensor data can include pressure data from pressure transducers 120, temperature data from thermocouple 122, acceleration data from accelerometer 124, or other data from other sensors.

Figure 5:
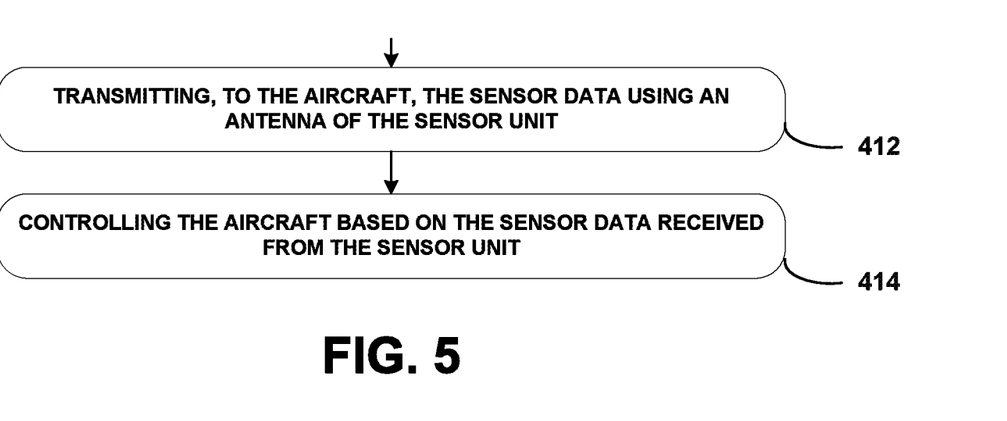
FIG. 5 shows a flowchart of another example method for use with the method shown in FIG. 4, according to an example implementation.

FIG. 5 shows a flowchart of another example method for use with the method shown in FIG. 4, according to an example implementation. At block 412, functions include transmitting, to the aircraft 302, the sensor data using an antenna 130 of the sensor unit 100. At block 414, functions include controlling the aircraft 302 based on the sensor data received from the sensor unit. For example, the aircraft controller can take the sensor data into account when making in-flight determinations. For instance, if pressure differentials determined from a pressure transducer 120 of sensor unit 100 are lower than a threshold pressure differential, the aircraft controller may determine that an engine has failed, and may increase a thrust output of another engine of aircraft 300.

Figure 6:
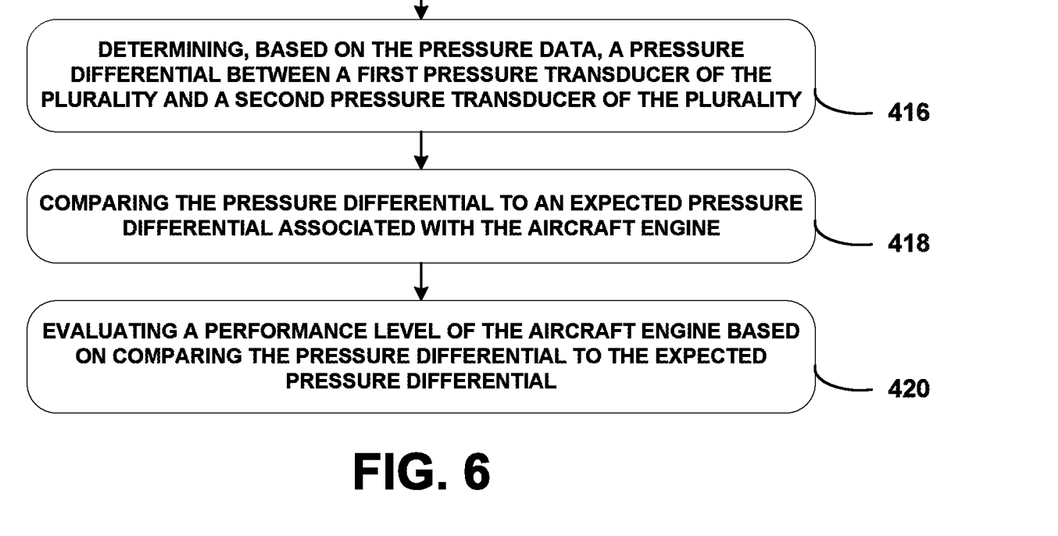
FIG. 6 shows a flowchart of another example method for use with the method shown in FIG. 4, according to an example implementation.

FIG. 6 shows a flowchart of another example method for use with the method shown in FIG. 4, according to an example implementation. In particular, FIG. 6 corresponds to an embodiment wherein the one or more sensors of the sensor unit 100 comprises a plurality of pressure transducers 120 configured to obtain pressure data at different locations of the sensor unit 100, and wherein the determined sensor data comprises the pressure data. At block 416, functions include determining, based on the pressure data, a pressure differential between a first pressure transducer of the plurality and a second pressure transducer of the plurality. At block 418, functions include comparing the pressure differential to an expected pressure differential associated with the aircraft engine. At block 420, functions include evaluating a performance level of the aircraft engine based on the comparison of the determined pressure differential and the expected pressure differential. For example, the expected pressure differential can be determined based on past flight pressure differential data, or based on simulated data. In other examples, the expected pressure differential may correspond to a desired engine thrust output. Determining that the pressure differential has a threshold level of similarity with the expected pressure differential (e.g., within 10% of one another) may indicate that the engine is operating normally. Conversely, a pressure differential that is not within a threshold level of similarity might indicate that the engine is performing poorly. Thus, FIG. 6 allows for evaluation of in-flight characteristics of an engine.

Figure 7:
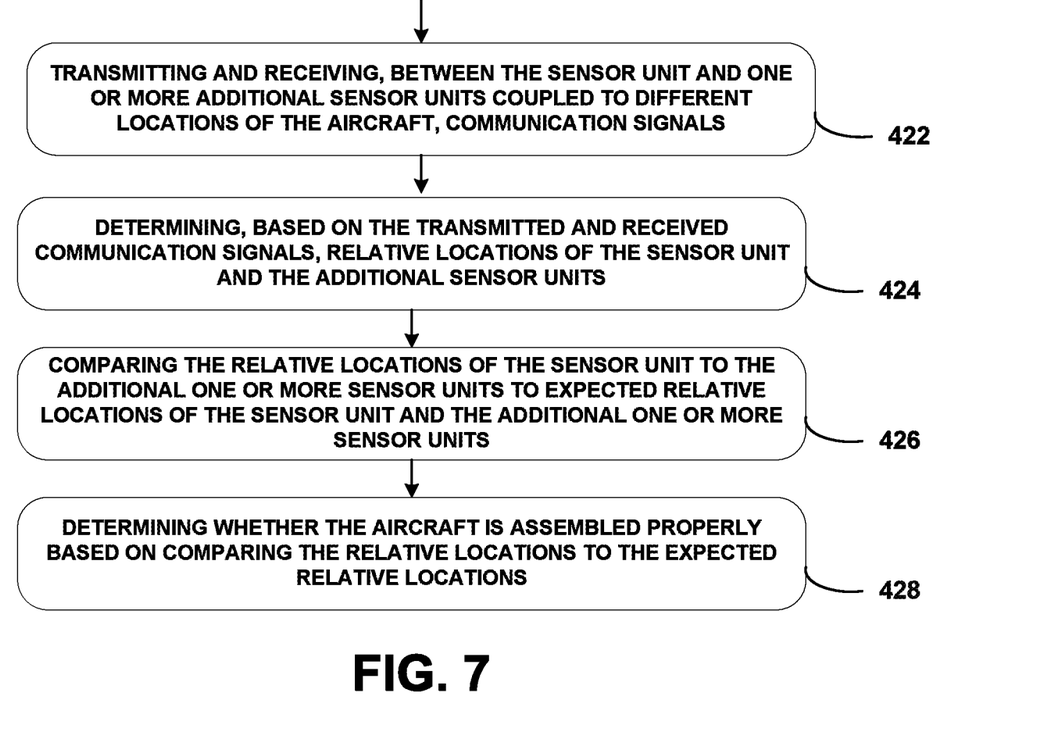
FIG. 7 shows a flowchart of another example method for use with the method shown in FIG. 4, according to an example implementation.

FIG. 7 shows a flowchart of another example method for use with the method shown in FIG. 4, according to an example implementation. At block 422, functions include transmitting and receiving, between the sensor unit 100 and one or more additional sensor units coupled to different locations of the aircraft 302, communication signals. At block 424, functions include determining, based on the transmitted and received communication signals, relative locations of the sensor unit 100 and the additional sensor units. At block 426, functions include comparing the determined relative locations of the sensor unit 100 to the additional sensor units to expected relative locations of the sensor unit and the additional sensor units. For instance, the expected relative locations may correspond to predetermined assembly instructions, such as plans and or renderings of the aircraft 302. At block 428, functions include determining whether the aircraft is assembled in accordance with predetermined aircraft assembly instructions based on comparing the determined relative locations and the expected relative locations. For instance, where each relative location falls within a threshold distance of the corresponding expected relative locations (e.g., within 5 centimeters of each corresponding expected relative location), the aircraft 302 can be determined as being assembled in accordance with the predetermined instructions. Conversely, if any of the relative locations falls outside the threshold distance, the aircraft 302 may be determined as not being assembled in accordance with the instructions. Thus, the sensor units described herein can be used to ease construction and assembly of an aircraft.

Figure 8:
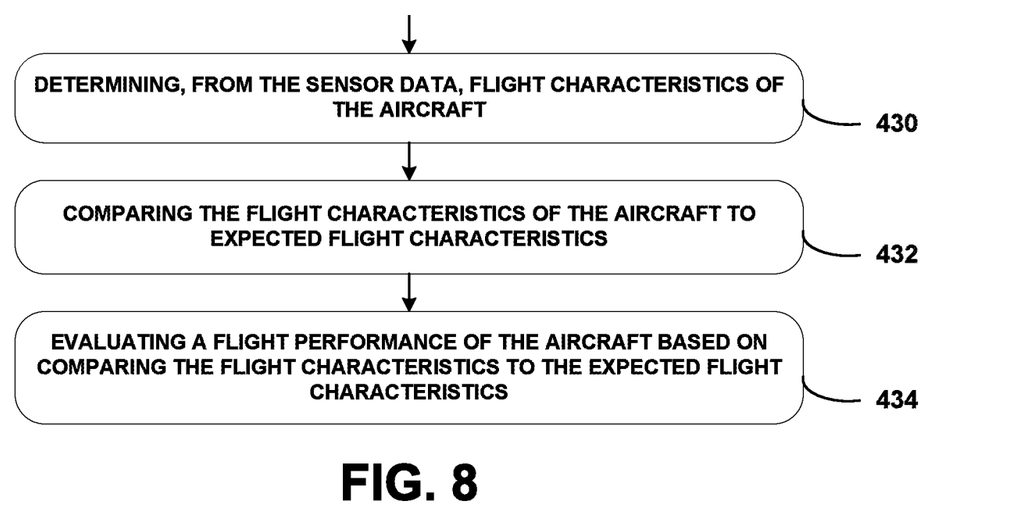
FIG. 8 shows a flowchart of another example method for use with the method shown in FIG. 4, according to an example implementation.

FIG. 8 shows a flowchart of another example method for use with the method shown in FIG. 4, according to an example implementation. At block 430, functions include determining, from the sensor data, flight characteristics of the aircraft 302. At block 432, functions include comparing the determined flight characteristics of the aircraft 302 to expected flight characteristics. For instance, expected flight characteristics may be based on simulated data or averaged data from prior flights. Further, the expected flight characteristics may correspond to pressure differentials that correspond to desired engine thrust outputs during the flight, desired accelerations during takeoff and landing, desired pitch and roll during flight, and/or other flight characteristics. At block 434, functions include evaluating a flight performance of the aircraft 302 based on comparing the determined flight characteristics and the expected flight characteristics. For example, if the determined flight characteristics differ from the expected flight characteristics for more than a threshold flight time (e.g. 25% of the flight time) the aircraft 302 may be determined as performing poorly. Conversely, if the determined flight characteristics differ from the expected flight characteristics for less than the threshold flight time, the aircraft 302 may be determined as performing normally.

Figure 9:
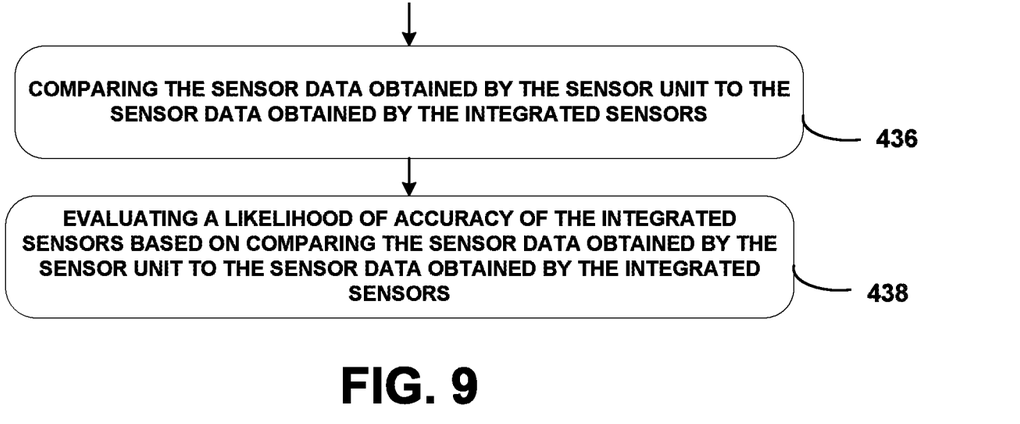
FIG. 9 shows a flowchart of another example method for use with the method shown in FIG. 4, according to an example implementation.

FIG. 9 shows a flowchart of another example method for use with the method shown in FIG. 4, according to an example implementation. In particular, FIG. 9 corresponds to an embodiment wherein the sensor data obtained by the sensor unit 100 is duplicative of sensor data obtained by one or more sensors that are integrated into the aircraft 302. For instance, the duplicative sensor data may relate to temperature, pressure differentials, acceleration, or other flight characteristics determinable by the sensor unit 100. Such integrated sensors may include flight sensors installed on the aircraft 302. At block 436, functions include comparing the sensor data obtained by the sensor unit 100 to the sensor data obtained by the integrated sensors. At block 438, functions include evaluating a likelihood of accuracy of the integrated sensors based on comparing the sensor data obtained by the sensor unit 100 to the sensor data obtained by the integrated sensors. For example, the sensor unit may correspond to an accuracy rating. If the sensor data obtained by sensor unit 100 and the sensor data obtained by the integrated sensors have a threshold level of similarity (e.g., within 10% of one another), the likelihood that the integrated sensors are accurate may increase in accordance with the accuracy rating of the sensor unit 100. Similarly, the likelihood that the integrated sensors are accurate may decrease in accordance with the accuracy rating of the sensor unit 100 if the sensor data obtained by sensor unit 100 and the sensor data obtained by the integrated sensors do not have a threshold level of similarity. Thus, sensor units described herein can be used to perform diagnostic testing of integrated sensors on an aircraft.

Figure 10:
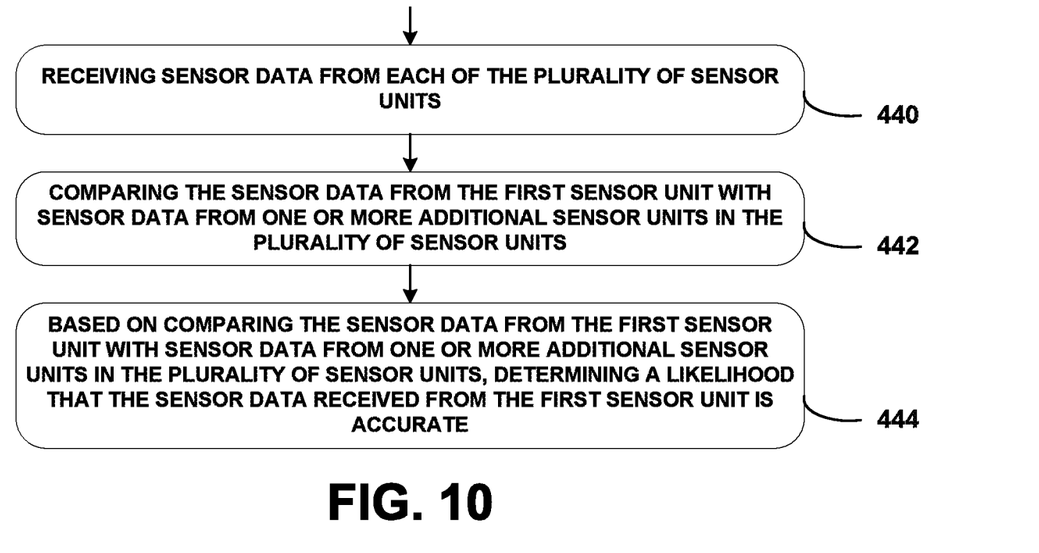
FIG. 10 shows a flowchart of another example method for use with the method shown in FIG. 4, according to an example implementation.

FIG. 10 shows a flowchart of another example method for use with the method shown in FIG. 4, according to an example implementation. In particular, FIG. 9 corresponds to an embodiment wherein the sensor unit 100 is a first sensor unit of a plurality of sensor units coupled to an exterior of the aircraft 302. At block 440, functions include receiving sensor data from each of the plurality of sensor units. At block 442, functions include comparing the sensor data from the first sensor unit with sensor data from one or more additional sensor units in the plurality of sensor units. At block 444, functions include, based on comparing the sensor data from the first sensor unit with sensor data from one or more additional sensor units in the plurality of sensor units, determining a likelihood that the sensor data received from the first sensor unit is accurate. For example, if sensor data from the first sensor unit does not have a threshold level of similarity with the sensor data from one or more additional sensor units (e.g., having average values within 10% of one another), it might be determined that sensor data from the first sensor unit is less likely to be accurate. Conversely, if sensor data from the first sensor unit does have a threshold level of similarity with the sensor data from one or more additional sensor units, it might be determined that sensor data from the first sensor unit is likely to be accurate. Thus, sensor units described herein can be used to perform self-diagnostics.

Within the examples described herein, acoustically powered sensor units provide a readily-installable and multi-use solution to the problems associated with in-flight diagnostics and maintenance of an aircraft. The sensor unit provides sustainable power to various sensors using otherwise wasted energy from aircraft engines, and allows for controlled use of received acoustic energy to ensure that the same sensor can be used across multiple flights. In addition, described sensor units are configured to efficiently receive and store energy from aircraft engines. Also within the described examples, acoustically powered sensor units provide self-diagnostic and pre-flight uses, such as during aircraft assembly.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An acoustically powered sensor unit for obtaining sensor data indicative of flight characteristics of an aircraft comprising:
    a housing comprising (i) first portion comprising a diaphragm and a plurality of pressure differential diaphragms, wherein the diaphragm is configured to receive acoustic energy from an engine of the aircraft, and (ii) a second portion coupled to an exterior of an aircraft;
    a voice coil actuator disposed within the housing and coupled to the diaphragm, wherein the voice coil actuator is configured to receive kinetic energy by way of a vibration of the diaphragm and responsively generate an electrical power signal; and
    one or more sensors disposed within the housing and powered using energy from the electrical power signal, wherein the one or more sensors comprise a plurality of pressure transducers disposed within the housing and corresponding to the plurality of pressure differential diaphragms, wherein the one or more sensors are configured to obtain the sensor data indicative of flight characteristics of the aircraft, wherein the sensor data comprises pressure data determined by the plurality of pressure transducers based on vibrations of the corresponding pressure differential diaphragms.

2. The acoustically powered sensor unit of claim 1, wherein the first portion of the housing is curved to generate a pressure differential across different locations of the housing, and wherein the pressure data is indicative of the pressure differential.

3. The acoustically powered sensor unit of claim 1, further comprising a control circuit and a battery electrically coupled to the voice coil actuator and the one or more sensors, and configured to receive energy from the electrical power signal, wherein the control circuit is configured to:
    determine a power output of the voice coil actuator; and
    based on the power output, (i) charge the battery using the electrical power signal, or (ii) discharge the battery in order to power the one or more sensors.

4. The acoustically powered sensor unit of claim 3, further comprising an antenna electrically coupled to the control circuit and configured to receive a control signal from the aircraft, wherein the control circuit is further configured to select a particular sensor from among the one or more sensors to receive energy from the electrical power signal based on the control signal.

5. The acoustically powered sensor unit of claim 1, wherein the voice coil actuator is disposed at a central portion of the sensor unit, wherein the one or more sensors are part of an integrated circuit disposed within the housing, and wherein the integrated circuit surrounds the voice coil actuator at an outer portion of the sensor unit.

6. The acoustically powered sensor unit of claim 1, wherein the diaphragm is configured to receive acoustic energy within a range of frequencies associated with an acoustic power output of the engine.

7. The acoustically powered sensor unit of claim 6, wherein the diaphragm has a diameter that is at least 30 millimeters (mm) and no more than 40 mm.

8. The acoustically powered sensor unit of claim 1, wherein the housing is coupled to the exterior of the aircraft such that the diaphragm is oriented towards the engine.

9. A system for obtaining sensor data indicative of flight characteristics of an aircraft comprising:
   an engine of the aircraft;
   a nacelle associated with the engine; and
   an acoustically powered sensor unit, wherein the sensor unit comprises:
      a housing comprising a first portion comprising a diaphragm, wherein the diaphragm is configured to receive acoustic energy from the engine, and a second portion coupled to the nacelle;
      a voice coil actuator disposed within the housing and coupled to the diaphragm, wherein the voice coil actuator is configured to receive kinetic energy by way of a vibration of the diaphragm and responsively generate an electrical power signal; and
      one or more sensors disposed within the housing and powered using energy from the electrical power signal, wherein the one or more sensors comprise a plurality of pressure transducers configured to obtain pressure data at different locations of the sensor unit, wherein the one or more sensors are configured to obtain the sensor data indicative of flight characteristics of the aircraft, and wherein the sensor data comprises pressure data; and
   an aircraft controller, wherein the aircraft controller is configured to:
      determine, based on the pressure data, a pressure differential between a first pressure transducer of the plurality and a second pressure transducer of the plurality; and
      compare the pressure differential to an expected pressure differential associated with the aircraft engine; and
      evaluate a performance level of the aircraft engine based on comparing the pressure differential to the expected pressure differential.

10. The system of claim 9, wherein the aircraft controller is further configured to:
   receive the sensor data from the sensor unit; and
   control the aircraft based on the sensor data.

11. The system of claim 9, wherein the sensor unit further comprises a battery, wherein the sensor unit is configured to charge the battery when the engine is running, and wherein the sensor unit discharges the battery to power the one or more sensors when the engine is not running.

12. The system of claim 9, wherein the acoustically powered sensor unit is a first sensor unit of a plurality of acoustically powered sensor units, and wherein the engine is a first engine, the system further comprising a second engine and a second sensor unit coupled to a nacelle associated with the second engine.

13. The system of claim 9, wherein the diaphragm is configured to receive acoustic energy within a range of frequencies associated with an acoustic power output of the engine.

14. The system of claim 9, wherein the first portion of the housing further comprises a plurality of pressure differential diaphragms that correspond to the plurality of pressure transducers, and wherein the pressure data is determined by the plurality of pressure transducers based on vibrations of the corresponding pressure differential diaphragms.

15. A method for obtaining sensor data using an acoustically powered sensor unit coupled to an aircraft, the method comprising:
   receiving, from an aircraft engine, by way of a diaphragm of the sensor unit, acoustic energy;
   transferring the acoustic energy received by the diaphragm to a voice coil actuator of the sensor unit;
   generating, by the voice coil actuator, an electrical power signal;
   powering one or more sensors of the sensor unit using energy from the electrical power signal;
   determining, by the one or more sensors, sensor data indicative of one or more flight characteristics of the aircraft;
   determining, from the sensor data, flight characteristics of the aircraft;
   comparing the flight characteristics of the aircraft to expected flight characteristics; and
   evaluating a flight performance of the aircraft based on comparing the flight characteristics to the expected flight characteristics.

16. The method for obtaining sensor data of claim 15, further comprising:
   transmitting, to the aircraft, the sensor data using an antenna of the sensor unit; and
   controlling the aircraft based on the sensor data received from the sensor unit.

17. The method for obtaining sensor data of claim 15, wherein the one or more sensors comprises a plurality of pressure transducers configured to obtain pressure data at different locations of the sensor unit, and wherein the sensor data comprises the pressure data, the method further comprising:
   determining, based on the pressure data, a pressure differential between a first pressure transducer of the plurality and a second pressure transducer of the plurality; and
   comparing the pressure differential to an expected pressure differential associated with the aircraft engine; and
   evaluating a performance level of the aircraft engine based on comparing the pressure differential to the expected pressure differential.

18. The method for obtaining sensor data of claim 15, further comprising:
   transmitting and receiving, between the sensor unit and one or more additional sensor units coupled to different locations of the aircraft, communication signals;

determining, based on the transmitted and received communication signals, relative locations of the sensor unit and the additional sensor units;

comparing the relative locations of the sensor unit to the additional sensor units to expected relative locations of the sensor unit and the additional sensor units; and determining whether the aircraft is assembled in accordance with predetermined assembly instructions based on comparing the relative locations to the expected relative locations.

19. The method for obtaining sensor data of claim 15, wherein the sensor data obtained by the sensor unit is duplicative of sensor data obtained by one or more integrated sensors that are integrated into the aircraft, the method further comprising:

comparing the sensor data obtained by the sensor unit to the sensor data obtained by the integrated sensors; and evaluating a likelihood of accuracy of the integrated sensors based on comparing the sensor data obtained by the sensor unit to the sensor data obtained by the integrated sensors.

20. The method for obtaining sensor data of claim 15, wherein the sensor unit is a first sensor unit of a plurality of sensor units coupled to an exterior of the aircraft, the method further comprising:

receiving sensor data from each of the plurality of sensor units;

comparing the sensor data from the first sensor unit with sensor data from one or more additional sensor units in the plurality of sensor units; and based on comparing the sensor data from the first sensor unit with sensor data from one or more additional sensor units in the plurality of sensor units, determining a likelihood that the sensor data received from the first sensor unit is accurate.

* * * * *